United States Patent [19]

McNamara et al.

[11] 4,356,161

[45] Oct. 26, 1982

[54] PROCESS FOR REDUCING THE TOTAL SULFUR CONTENT OF A HIGH $CO_2$-CONTENT FEED GAS

[75] Inventors: Harold J. McNamara, Houston; Joan A. Schilk, Tomball, both of Tex.

[73] Assignee: Shell Oil Company, Houston, Tex.

[21] Appl. No.: 295,439

[22] Filed: Aug. 24, 1981

[51] Int. Cl.$^3$ .................. C01B 17/04; B01D 53/34
[52] U.S. Cl. .................. 423/573 R; 423/228; 423/229
[58] Field of Search ............ 423/228, 229, 243, 573

[56] References Cited

U.S. PATENT DOCUMENTS

| | | | |
|---|---|---|---|
| 3,961,015 | 6/1976 | Dailey | 423/243 X |
| 3,965,244 | 6/1976 | Sykes, Jr. | 423/243 X |
| 3,989,811 | 11/1976 | Hill | 423/229 |
| 4,153,674 | 5/1979 | Verloop et al. | 423/573 R |
| 4,241,032 | 12/1980 | Werner et al. | 423/229 |

*Primary Examiner*—G. Peters
*Attorney, Agent, or Firm*—Dean F. Vance

[57] ABSTRACT

In the process for reducing the total sulfur content of a high $CO_2$-content feed gas stream, the feed gas is first passed to an absorption column. The unabsorbed, high $CO_2$-content gas is then routed to a reduction step where it is combined with Claus off-gases and the sulfur compounds are reduced to $H_2S$. The treated gas is then passed to a second absorption column and the unabsorbed gas is vented to the atmosphere. The fat solvent from both absorption columns is stripped in a common stripper and the stripped gas is passed to a Claus unit for conversion to elemental sulfur.

7 Claims, 1 Drawing Figure

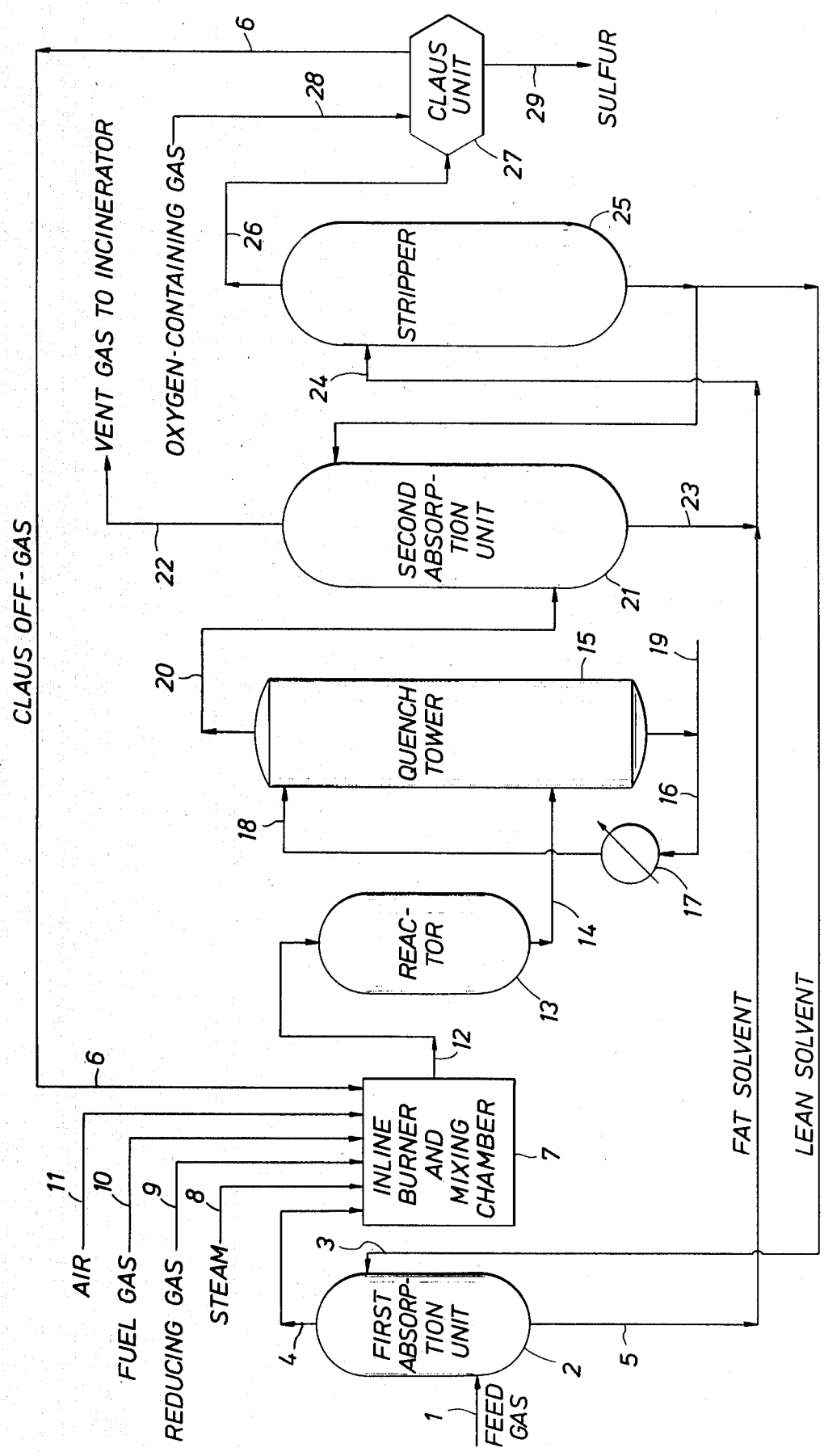

PROCESS FOR REDUCING THE TOTAL SULFUR CONTENT OF A HIGH CO₂-CONTENT FEED GAS

BACKGROUND OF THE INVENTION

1. Field of the Invention

The invention relates to a process for the removal of sulfur compounds from a high $CO_2$-content feed gas stream, wherein the sulfur constituents of the feed gas are converted to elemental sulfur in a Claus-type sulfur recovery unit.

2. Description of the Prior Art

In general, feedstocks for sulfur recovery units are hydrogen sulfide-containing gases produced in the regeneration step of gas purification processes. These gas purification processes, which are required in order to reduce the sulfur constituents (in most cases mainly hydrogen sulfide) of industrial gases, such as refinery gas, natural gas or synthesis gas produced by the partial combustion of hydrocarbons, to acceptably low levels prior to their further use, usually involve absorbing the sulfur components of the gases in a liquid absorbent which is then regenerated to give hydrogen sulfide-rich gases. These latter gases are then passed to a sulfur recovery unit, elemental sulfur being produced and removed. The reaction of gases of such a unit are then preferably further treated in order to reduce the sulfur content of the gases to a very low level before the gases are finally discharged to the atmosphere. In the sulfur recovery unit the hydrogen sulfide is converted to elemental sulfur by the well-known Claus reaction. Sulfur recovery units of the Claus type or Claus plants are widely used in industry and are well-established.

Apart from hydrogen sulfide, the above-mentioned industrial gases and syn gases often contain other sulfur constituents such as carbonyl sulfide and other organic sulfur compounds, e.g., mercaptans, which must also be removed before these gases are used. Accordingly, a suitable liquid absorbent is typically used which removes all sulfur constituents present. However, these also contain large amounts of carbon dioxide. The liquid absorbents applied in the gas purification processes for the removal of hydrogen sulfide are generally also good absorbents for carbon dioxide. For the removal of carbonyl sulfide by means of absorption, a solvent is in practice used which is in efficient absorbent for carbon dioxide. Consequently, regeneration of the fat liquid absorbent yields hydrogen sulfide/carbon dioxide-containing gases which have then to be processed in the Claus plant.

For some gases, such as synthesis gas produced by the partial combustion of coal, the level of $CO_2$ and COS may be very high, i.e., the stream may contain greater than 80% $CO_2$ and COS with less than 15% $H_2S$. This presents significant problems in the above described typical gas processing scheme. One process supposedly for handling relatively high $CO_2$-content gas streams is described in U.S. Pat. No. 4,153,674. Two separate absorption/desorption steps are employed in the 4,153,674 patent, one being the non-selective absorption of the feed gas and the other being the selective absorption of the reduced Claus off-gas. However, a basic problem with the process scheme of the 4,153,674 patent is that for high $CO_2$ and COS content feeds, the total sulfur emissions from the lean gas (ex. non-selective absorption) and the waste gas (ex. selective absorption) would exceed environmentally acceptable levels. This is because of the contribution of COS to total sulfur emissions. A different process for the process of 4,153,674 is required to deal with very high levels of $CO_2$ and COS in feed gas streams.

SUMMARY OF THE INVENTION

The present invention comprises an improved process to reduce the total sulfur content of gas streams to low levels, where the gas stream contains very high amounts of $CO_2$ and COS. In particular, the present invention broadly deals with a process for reducing the total sulfur content of a high $CO_2$-content feed gas to environmentally acceptable levels comprising:

(a) passing a feed gas stream comprising 5 to 95% volume, $CO_2$, 0.03 to 20% volume $H_2S$, and 0.02 to 2% volume COS to a first absorption step where said feed gas stream is contacted with a liquid and regenerable polyalkanolamine absorbent selective for hydrogen sulfide, therein producing an unabsorbed portion and a hydrogen sulfide-enriched polyalkanolamine absorbent;

(b) passing said unabsorbed portion of the feed gas stream from step (a) together with a hydrogen- and/or carbon monoxide-containing gas, the off gases from the associated Claus process step (e), and a certain amount of steam over a sulfided Group VI and/or Group VIII metal catalyst supported on an inorganic oxidic carrier in a reduction step wherein the amount of steam is adjusted to reduce the COS concentration in the resulting treated gas to a level below about 0.05% volume;

(c) passing the gas stream thus treated in said reduction step (b) to a second absorption step in which said treated gas stream is contacted with a liquid and regenerable polyalkanolamine absorbent under such conditions that the unabsorbed portion of said treated gas stream has below about 0.05% volume total sulfur compounds, discharging the unabsorbed portion of said treated gas stream, optionally after incineration, into the atmosphere, and producing a hydrogen sulfide-enriched polyalkanolamine absorbent;

(d) regenerating the hydrogen sulfide-enriched absorbents from absorption steps (a) and (c) by heating and/or stripping and using them again for further absorption of hydrogen sulfide;

(e) passing the hydrogen sulfide liberated in the regeneration step (d) to a Claus process step; and (f) passing the off-gases produced in said Claus process step (e) to said reduction step (b).

BRIEF DESCRIPTION OF THE DRAWING

The drawing is a schematic flow diagram of one mode of practicing this invention.

DETAILED DESCRIPTION OF THE INVENTION

The feed gas stream treated in the present invention may be obtained from a variety of refinery processes, industrial processes, or the partial oxidation of fuels such as coal. The feed gas streams contemplated herein have the following general composition (expressed in percent by volume).

|  | Preferred | More Preferred |
|---|---|---|
| $CO_2$ | 5–95% | 40–90% |
| $H_2S$ | 0.03–20% | 0.03–10% |

|        | Preferred | More Preferred |
|--------|-----------|----------------|
| COS    | 0.02–2%   | 0.02–1%        |

Other constituents of the feed gas stream include $N_2$, $CH_4$, $NH_3$, CO, $H_2$ and $H_2O$. A key aspect of the present invention is the very high concentration of $CO_2$ and COS in the feed.

In the first step of the process, the feed gas stream is contacted with a liquid and regenerable selective solvent in a first absorption zone. The first absorption zone may comprise either a packed or a tray column. In order to decrease the co-absorption of carbon dioxide a relatively high gas velocity is applied. It is preferred to use a gas velocity between 0.5 and 3.0 m/sec. with respect to the aerated part of the absorption zone. It is further preferred to apply an absorption zone having less than 30 absorption layers. If a tray column is used, the column should have less than 30 contacting valve trays. A packed column should have less than 30 theoretical plates. The use of an absorption zone having between 5 and 15 absorption layers is particularly preferred.

The liquid and regenerable solvent is preferably an aqueous solution of a polyalkanolamine, such as diisopropanolamine (DIPA), methyldiethanolamine (MDEA) or triethanolamine (TEA). It is much preferred that the polyalkanolamine be selective to the $H_2S$ and that it reduce the co-absorption of $CO_2$. Accordingly, a much preferred polyalkanolamine is MDEA. The alkanolamines are preferably used in aqueous solutions in a molar concentration of 0.5 to 5, preferably 1 to 3.

The unabsorbed portion of the feed gas stream, comprising greater than about 10 percent by volume of the $CO_2$ and greater than about 50 percent by volume of the COS in the feed stream, then passes to a reduction step. This reduction step involves passing the unabsorbed portion of the feed gas stream from the first absorption zone, allong with the off-gas stream from the associated Claus-type process over a sulfided Group VII and/or Group VIII catalyst on an organic oxidic carrier. By passing this combined stream over the catalyst as defined, at the temperature range specified, all sulfur constituents of the gas mixture other than hydrogen sulfide, including any mercaptans and/or disulfides present, will be converted to hydrogen sulfide. Sulfur dioxide will be reduced by the hydrogen present, whereas carbonyl sulfide and carbon disulfide will be hydrolysed over the catalyst to hydrogen sulfide and water. Some hydrogenation of carbonyl sulfide and carbon disulfide will also occur. Any elemental sulfur present will also be reduced to hydrogen sulfide under the conditions specified.

Step (b) of the process according to the present invention is preferably carried out at a temperature between 200° and 350° C. To this end the mixture of the reaction off-gas of the sulfur recovery unit and the unabsorbed portion of the feed gas stream is passed over the said catalyst in the presence of at least the stoichiometric amount of free hydrogen- and/or free carbon monoxide containing gas required for the complete conversion of sulfur dioxide and elemental sulfur to hydrogen sulfide. Generally, 1.3 to 2.0 times the required stoichiometric amount is applied. Higher amounts of hydrogen and/or carbon monoxide are not considered for economical reasons only.

For the purposes of the present invention carbon monoxide is equivalent to hydrogen in its reducing capacities, as it produces hydrogen in situ in accordance with the following reaction equation:

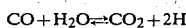

$$CO + H_2O \rightleftharpoons CO_2 + 2H$$

It has been noted that reduction of sulfur dioxide with carbon monoxide is a very fast reaction because of the hydrogen produced in situ. For that reason, the use of a hydrogen- and carbon monoxide-containing gas is particularly preferred in step (b). A gas with a $H_2/CO$ ratio between 9:1 and 2:8 may suitably be used, as gas with a $H_2/CO$ ratio of about 4:1 being preferred.

The free hydrogen- and/or free carbon-monoxide-containing gas used may advantageously be a gas containing both compounds, such as town gas, water gas or synthesis gas. Pure hydrogen or carbon monoxide may also be used. Suitable hydrogen-rich gases or gas mixtures are the off-gas of a catalytic reforming unit, the gas produced in a hydrogen plant or the gas obtained from a processing unit for saturated crude gases from petroleum. A free hydrogen- and free carbon monoxide-containing gas may further be produced by the substoichiometric combustion of lower hydrocarbon gases such as methane, ethane, propane, butane or mixtures thereof. The production of such a gas may suitably be combined with the heating of the reaction off-gas and said hydrogen sulfide-containing gas to the required reaction temperature as set out hereinafter.

After having passed the last bed of the sulfur recovery unit and the relevant condenser for the recovery of elemental sulfur, the reaction off-gases normally have a temperature of from 130° C. to 170° C. For the reduction stage over the Group VI and/or Group VIII metal catalyst, however, the off-gases must have a higher temperature and therefore these off-gases have first to be heated to a temperature in excess of 170° C. The reaction off-gases are preferably heated to a temperature in the range of from 180° C. to 450° C., together with the unabsorbed portion of the feed gas stream from the first absorption zone by mixing the same with a hydrogen- and carbon monoxide-containing gas produced by the substoichiometric combustion of a lower hydrocarbon, e.g., fuel gas, or a mixture of lower hydrocarbons, with an oxygen-containing gas. Mixing of the said gases may be effected in a mixing chamber following the combustion chamber of the burner used for the substoichiometric combustion.

The increase in temperature to above 180° C. is also important in view of the presence of small amounts of elemental sulfur in the form of a mist in the reaction off-gas. This objectionable sulfur mist disappears when the temperature is raised above the dew point of sulfur. It has also been found that as a result of raising the temperature to above 180° C., the presence of elemental sulfur in the gas phase has no adverse effect on the catalytic activity of the reduction catalyst.

After heating to a temperature in excess of 180° C., the reaction off-gas and the unabsorbed portion of the feed gas stream, together with a free-hydrogen-containing and/or free carbon monoxide-containing gas, are passed over a sulfided Group VI and/or Group VIII metal catalyst in order to reduce sulfur dioxide to hydrogen sulfide. At the same time, elemental sulfur and carbonyl sulfide and/or other organic sulfur compounds are converted to hydrogen sulfide. Although sulfided Group VI and/or Group VIII metal catalysts supported on an inorganic oxidic carrier in general are suitable, preferred reduction catalysts for carrying out the present invention are catalysts containing one or more of the metals: molybdenum, tungsten and chromium (of the Group VI metals), and/or one or more of the metals: cobalt, nickel and iron (of the Group VIII metals), a combination of one such Group VI metal and one such Group VIII metal being preferred. The inorganic oxidic carrier may be alumina, silica, magnesia, boria, thoria, zirconia or a mixture of two or more of these compounds. Most preferred reduction catalysts for use in accordance with the process of the invention are a $Ni/Mo/Al_2O_3$ or a $Co/Mo/Al_2O_3$ catalyst.

The Group VI and/or Group VIII metal catalyst is used in the sulfided form. Sulfiding may be effected beforehand by means of a suitable sulfiding agent, such as a mixture of hydrogen and hydrogen sulfide containing 10-15% by volume of a sulfide. It is also possible, to sulfide the catalyst in situ by means of the reaction off-gas itself. Particularly suitable, however, is a sulfiding mixture comprising hydrogen, hydrogen sulfide and water in a ratio of 1:1:1, the sulfiding temperature being between 300° and 400° C. The catalyst to be sulfided may comprise the Group VI and/or Group VIII metals as the oxide or as the element.

Before being contacted with the liquid absorbent for hydrogen sulfide, the reduced gas mixture obtained in step (b) is first cooled. Preferably it is cooled to a temperature in the range of from 6° to 60° C. More preferably cooling is effected in two steps, the first one being an indirect heat exchange and the second one a direct heat exchange with water.

After cooling, the reduced (or treated) gas mixture is contacted with a liquid and regenerable solvent in a second absorption zone. The same amine, conditions and the like employed in the first absorption zone are employed for the second absorption zone.

The unabsorbed portion of the reduced gas mixture from the second absorption column is then discharged into the atmosphere. If desired, this unabsorbed portion may also be incinerated in the usual manner before passing it to the stack. The unabsorbed portion typically contains less than 0.05 percent by volume total sulfur compounds as $H_2S$. A key aspect of the present invention is that the sulfur level of the stream vented to the atmosphere meets the present environmental regulations.

The hydrogen sulfide-enriched absorbents from the first and second absorption zones are regenerated by heating and/or stripping with steam. This produces a hydrogen sulfide enriched gas mixture and a regenerated absorbent which is re-used in steps (a) and (c) for further hydrogen sulfide absorption.

The hydrogen sulfide-rich gas mixture which is freed in the regeneration of the absorbent, which also contains some co-absorbed carbon dioxide and water, is first cooled in order to condense the water present therein. Normally, at least part of this water is recycled to the regeneration step in order to maintain the water content of the aqueous absorbent at the required level. After cooling, the hydrogen sulfide-rich gas mixture is passed to the sulfur recovery unit (Claus unit) to recover elemental sulfur from the gas.

As used herein, "Claus reaction" or "Claus process" refers to the reaction between hydrogen sulfide and sulfur dioxide in which elemental sulfur and water are produced. By "sulfur recovery unit of the Claus type" or "Claus plant" is meant a plant for carrying out the Claus reaction, incorporating a thermal zone in which hydrogen sulfide is partially combusted to produce sulfur dioxide in the correct proportion which then reacts with the unburned hydrogen sulfide to give sulfur and water, the sulfur then being condensed and recovered, followed by one or more catalytic zones in which the same reaction is further promoted by means of a suitable catalyst and additional sulfur is recovered.

DETAILED DESCRIPTION OF THE DRAWING

The invention will now be further illustrated by reference to the Drawing. Referring to the Drawing, a feed gas stream emanating from a partial oxidation process is passed via line 1 to the first absorption unit 2 where it is contacted with a lean liquid and regenerable polyalkanolamine absorbent 3, such as aqueous MDEA. This first absorption unit is operated in a selective manner to remove most of the $H_2S$, but not the $CO_2$ and COS. An unabsorbed gas stream substantially free of $H_2S$ leaves the first absorption unit via line 4. A fat solvent ($H_2S$-rich absorbent) stream exits the first absorption unit via line 5.

The unabsorbed gas stream 4 is combined with the Claus off-gas stream 6 and is fed to an in-line burner and mixing chamber 7 along with stream 8, reducing gas stream 9, a fuel gas stream 10, and an oxygen-containing gas stream (such as air) 11. In the in-line burner, a hydrogen and carbon monoxide-containing gas is produced by the substoichiometric combustion of the hydrocarbon fuel gas. In the mixing chamber 7, the gas mixture is mixed with the hot combustion gas and a heated gas mixture, now also containing the required hydrogen and carbon monoxide, is introduced via line 12 into the reactor 13 where sulfur compounds other than hydrogen sulfide are converted to hydrogen sulfide over a reduction catalyst. The reduced gas mixture, comprising substantially no other sulfur compounds than hydrogen sulfide, leaves reactor 13 via line 14 and the gas is cooled in a quench tower 15. An important aspect of the present invention is that the amount of steam added via line 8 is adjusted such that the COS concentration in the reactor product 14 is reduced to a low level. A portion of the quench tower bottoms is routed to a sour water stripper via line 19, while the majority is routed via line 16 through a cooler 17 and employed as the quench water 18. The cooled gas mixture is passed via line 20 to the second absorption unit 21. In the second absorption unit, the gas mixture is contacted with a lean polyalkanolamine absorbent such as aqueous MDEA. The unabsorbed portion of the gas stream, comprising mainly carbon dioxide and nitrogen, is discharged from the unit via line 22. This unabsorbed portion contains less than about 0.05% by volume total sulfur compounds. Typically, this stream 22 is combusted in the Claus incinerator to convert any traces of hydrogen sulfide to $SO_2$ before being vented to the atmosphere.

The fat solvent exits via line 23 from the second absorption unit and is combined with the fat solvent from the first absorption unit (line 5). The combined fat solvent stream enters the stripper 25 via line 24. In the stripper, heat and/or stripping steam is employed to remove the hydrogen sulfide from the fat solvent. The hydrogen sulfide-rich gas mixture is then passed via line 26 to the sulfur recovery unit 27 (Claus unit). The Claus unit 27 typically incorporates a thermal stage and an after-cooler/sulfur condenser and a number of catalytic stages with interstage coolers/sulfur condensers (not shown in the Drawing). The hydrogen sulfide is converted in the Claus unit, a oxygen-containing gas being fed via line 28 and elemental sulfur being removed via line 29. The reaction off-gases leave the unit via line 6 and are treated as described above.

The invention is further illustrated by reference to the following Illustrative Embodiment, which is given for the purposes of illustration only, and is not meant to limit the invention to the particular reactants and conditions employed therein.

Illustrative Embodiment I

Illustrative Embodiment I comprises a computer simulation of a process according to the present invention. The process flow scheme employed was similar to that shown in the Drawing and explained above. The gas feed stream was obtained from the partial combustion of coal (after chemical synthesis steps) and contained about 90% volume $CO_2$, 4% volume $H_2S$ and 0.1% volume COS with the remainder comprising $N_2$, $CH_4$, $NH_3$, CO, $H_2$ and $H_2O$.

The feed gas stream 1 was contacted in the first absorption column 2 with an aqueous methydiethanolamine (MDEA) absorbent. The unabsorbed gas product exiting via line 4 comprised about 93% $CO_2$, which was about 92% of the $CO_2$ in the feed gas stream 1. Over about 98% of the $H_2S$ in the feed gas stream was absorbed by the MDEA solvent. The unabsorbed gas product 4 was combined with the Claus off-gas stream 6, stream 8, reducing gas 9, fuel gas 10 and air 11 in the in-line burner and mixing chamber 7. The product gas from the mixing chamber was then passed over a Co-Mo on alumina catalyst in the reactor 13, where the $SO_2$ and COS were converted to $H_2S$ and $CO_2$. The reactor product was then quenched in a quench tower 15. The cooled gas was then routed to a second absorption unit 21 where the gas was contacted with an aqueous MDEA absorbent. The vent gas 22 from the second absorber, containing less than about 0.012% volume sulfur compounds as $H_2S$, was routed to the Claus plant incinerator before being vented to the atmosphere. The fat solvent from both the first and second absorption columns were routed to the stripper 25, where the $H_2S$-rich gas product stream was obtained. This $H_2S$-rich gas stream 26 was then routed to a Claus unit 27. The off-gases 6 from the Claus unit were routed back to the in-line burner 7.

What is claimed is:

1. A process for reducing the total sulfur content of a high $CO_2$-content feed gas to environmentally acceptable levels comprising:

(a) passing a feed gas stream comprising 40 to 95% volume $CO_2$, 0.03 to 20% volume $H_2S$, and 0.02 to 2% volume COS to a first absorption step where said feed gas stream is contacted with a liquid and regenerable polyalkanolamine absorbent selective for hydrogen sulfide, therein producing an unabsorbed portion and a hydrogen sulfide-enriched polyalkanolamine absorbent;

(b) passing said unabsorbed portion of the feed gas stream from step (a) together with a hydrogen- and/or carbon monoxide-containing gas, the off gases from the associated Claus process step (e), and a certain amount of steam over a sulfided Group VI and/or Group VIII metal catalyst supported on an inorganic oxidic carrier in a reduction step wherein the aount of steam is adjusted to reduce the COS concentration in the resulting treated gas to a level below about 0.05% volume;

(c) passing the gas stream thus treated in said reduction step (b) to a second absorption step in which said treated gas stream is contacted with a liquid and regenerable polyalkanolamine absorbent under such conditions that the unabsorbed portion of said treated gas stream has below about 0.05% volume total sulfur compounds, discharging the unabsorbed portion of said treated gas stream, optionally after incineration, into the atmosphere, and producing a hydrogen sulfide-enriched polyalkanolamine absorbent;

(d) regenerating the hydrogen sulfide-enriched absorbents from absorption steps (a) and (c) by heating and/or stripping and using them again for further absorption of hydrogen sulfide;

(e) passing the hydrogen sulfide liberated in the regeneration step (d) to a Claus process step; and (f) passing the off-gases produced in said Claus process step (e) to said reduction step (b).

2. The process of claim 1 wherein the unabsorbed portion of the feed gas stream from step (a) contains less than 10% by volume of the $H_2S$ and greater than 90% by volume of the COS and $CO_2$ in said feed gas stream.

3. The process of claim 1 wherein said liquid and regnerable polyalkanolamine absorbent is aqueous methyldiethanolamine.

4. The process of claim 1 wherein said catalyst is a Co-Mo catalyst on an alumina carrier.

5. The process of claim 1 wherein said catalyst is a Ni-Mo catalyst on an alumina carrier.

6. The process of claim 1 wherein the temperature in step (b) is between 200° and 350° C. and the reduced gas mixture obtained in step (b) is cooled to a temperature in the range of from 6° to 60° C. in two steps, the first one being an indirect heat exchange and the second one a direct heat exchange with water, and is thereafter contacted with the liquid, regenerable abosrbent in a layered absorption zone having less than 20 absorption layers at a gas velocity between 0.5 and 3.0 m/sec. with respect to the aerated part of the absorption zone.

7. The process of claim 1 wherein said free gas stream comprises 40 to 90% volume $CO_2$, 0.03 to 10% volume $H_2S$ and 0.02 to 1% volume COS.

* * * * *